(12) United States Patent
Shiotani et al.

(10) Patent No.: US 6,206,314 B1
(45) Date of Patent: Mar. 27, 2001

(54) SEAT BELT RETRACTOR

(75) Inventors: Masahiro Shiotani; Noriyuki Kosugi; Isamu Mizuno; Hiromasa Tanji, all of Shiga (JP)

(73) Assignee: Takata Corporation, Tokyo (JP)

( * ) Notice: Subject to any disclaimer, the term of this patent is extended or adjusted under 35 U.S.C. 154(b) by 0 days.

(21) Appl. No.: 09/388,545

(22) Filed: Sep. 2, 1999

(30) Foreign Application Priority Data

Sep. 9, 1998 (JP) .................................................. 10-254895

(51) Int. Cl.[7] .................................................. B60R 22/34
(52) U.S. Cl. ........................................................ 242/375.3
(58) Field of Search ......................... 242/375.3; 280/806, 280/807; 297/475–478

(56) References Cited

U.S. PATENT DOCUMENTS 5,628,470 * 5/1997 Ray et al. ........................... 242/375.3
5,934,595 * 8/1999 Kohlndorfer ....................... 242/375.3

* cited by examiner

Primary Examiner—John M. Jillions
(74) Attorney, Agent, or Firm—Kanesaka & Takeuchi

(57) ABSTRACT

A seat belt retractor of the invention is basically formed of a first reel, a second reel, a rope extending between the first reel and the second reel, and a spiral spring situated in the second reel as an urging force providing device. The first reel is connected coaxially to a rotational axis of a reel shaft for winding a webbing, and has a drum shape on which the rope fixed at one end to the first reel is wound. The second reel has a rotational shaft disposed parallel to and laterally spaced away from the first reel. The second reel includes a small diameter reel portion, a large diameter reel portion, and a transition portion connecting the small diameter reel portion and the large diameter reel portion. The rope attached to the first reel extends to the small diameter reel portion and the transition portion, and is wound around a groove of the large diameter reel portion. The seat belt retractor is improved in assembling the members, and an approximately constant force for withdrawing the webbing can be achieved even if a withdrawal amount of the webbing is increased.

6 Claims, 5 Drawing Sheets

SEAT BELT RETRACTOR

BACKGROUND OF THE INVENTION AND RELATED ART STATEMENT

The present invention relates to a seat belt retractor, and more particularly, to a seat belt retractor wherein a force for withdrawing a seat belt is substantially uniform even when a withdrawing amount of the seat belt is increased.

Conventionally, in a seat belt retractor equipped in a motor vehicle, a seat belt (hereinafter referred to as a webbing in case of indicating a belt itself to be wound) is wound around a reel by spring driving force of a spiral spring or the like built in the seat belt retractor. In this type of the seat belt retractor, as a withdrawing amount of the webbing is increased, the spiral spring is wound so as to increase an urging-force thereof. Thus, there has been a situation that a force of withdrawing the webbing is increased as the amount of withdrawal of the webbing is increased.

To solve the aforementioned situation, a seat belt retractor has already been developed, which includes a tension reducing mechanism for reducing the force of withdrawing the webbing as disclosed in Japanese Patent No. 2,711,428. The tension reducing mechanism of the seat belt retractor is explained hereunder by referring to FIG. 7. As shown in FIG. 7, a belt reel 51 of a seat belt retractor 50 is axially supported by a base frame (not shown) through a rotational shaft 59. A webbing 57 is arranged to be wound on an outer peripheral surface of the belt reel 51. Further, a housing 61 for the tension reducing mechanism is fixed on an outer side wall of the base plate (not shown). A shaft end 59a of the rotational shaft 59 extends to an inside of the housing 61 attached adjacent to the base frame. A first rope pulley 52 in a shape of a truncated cone is fixed to the shaft end 59a extending inside the housing 61. A spiral guide groove 55 is incised on an outer peripheral surface of the first rope pulley 52.

Furthermore, a second rope pulley 54 is accommodated in the housing 61 in a state that the second rope pulley 54 is axially supported through a rotational shaft 62. As in the first rope pulley 52, the second rope pulley 54 is formed in a shape of a truncated cone and provided with a spiral guide groove 58 on an outer peripheral surface thereof. The rotational shaft 62 is disposed parallel to the rotational shaft 59 at a position laterally spaced away therefrom with a predetermined distance. As shown in FIG. 7, a hollow chamber 63, which has a cylindrical shape and is coaxial with the rotational shaft 62, is formed in the second rope pulley 54. The spiral spring 56 is situated inside the hollow chamber 63. One end of the spiral spring 56 is fixed to the second rope pulley 54 supported by the rotational shaft 62, and the other end of the spiral spring 56 is fixed to a bearing boss 65 formed in the hollow chamber 63 of the second rope pulley 54.

Further, a rope 53 extends between the first rope pulley 52 and the second rope pulley 54. In a condition that the webbing 57 is completely wound, one end of the rope 53 is fixed to a fixing end (not shown) at a largest diameter position of the guide groove 58 of the second rope pulley 54 such that the rope 53 is spirally wound in the entire periphery or length of the guide groove 58, and the other end of the rope 53 is fixed to a fixing end 67 of a largest diameter portion of the guide groove 55 of the first rope pulley 52.

In the tension reducing mechanism thus structured, an urging force for winding generated in case of winding up the spiral spring 56 is transmitted to the second rope pulley 54 as a rotational force or torque for winding the end portion of the rope 53 wound in the guide groove 58 of the second rope pulley 54. At this time, as shown in FIG. 7, the rope 53 extends from the smallest diameter portion of the second rope pulley 54 to the largest diameter portion of the guide groove 55 of the first rope pulley 52. When the webbing 57 in the wound state is withdrawn against a winding force shown by an arrow K in the figure, the first rope pulley 52 of the tension reducing mechanism rotates in a direction of an arrow A in the figure, so that the rope 53 is gradually wound on the first rope pulley 52. At this time, the rope 53 is wound on the first rope pulley 52 while being held in the guide groove 55. In accordance therewith, the rope 53 wound in the guide groove 58 is gradually unwound from the second rope pulley 54.

As described above, the rope 53 held in the guide grooves 55 and 58 respectively formed on the outer peripheral surfaces of the first rope pulley 52 and the second rope pulley 54 transmits the rotations of the rope pulleys 52 and 54 therebetween. In this case, by adequately setting the cone shapes of the first rope pulley 52 and the second rope pulley 54, a rotational ratio of the first rope pulley 52 to the second rope pulley 54 can be controlled, so that the force for withdrawing the webbing can be made constant or reduced regardless of a withdrawal amount of the webbing.

In the seat belt retractor shown in FIG. 7, however, since the tension reducing mechanism is formed of two rope pulleys in the shape of the truncated cone having the spiral guide groove, there have been a problem that assembling the rope pulleys with the housing is poor, and a problem that the miniaturizing the entire apparatus is difficult because the roller pulley itself can not be miniaturized.

Also, in the seat belt retractor, by winding the rope on the outer peripheral surface of the rope pulley in the shape of the truncated cone, the force for withdrawing the webbing is reduced with a long unwinding stroke. However, since the rope is wound several times on the outer peripheral surface of the truncated cone with a gentle lead angle, a ratio of decreasing a radius of the wound rope is small at the time of unwinding the rope, so that a change in the force of withdrawing the webbing can not be taken greatly.

Further, since the rope winding surface is inclined as a result of the shape of the truncated cone, it is necessary to form the deep guide groove so as not to allow the rope to be loosened and disengaged from the guide grooves in case of winding after the seat belt is suddenly withdrawn.

Accordingly, an object of the invention is to solve the aforementioned problems in the conventional retractor and to provide a seat belt retractor which is good in assembly and includes a compact tension reducing mechanism to achieve a high reliability in withdrawing the seat belt.

Further objects and advantages of the invention will be apparent from the following description of the invention.

SUMMARY OF THE INVENTION

To achieve the above object, a seat belt retractor of the present invention is formed of a first reel coaxially connected to a rotational axis of a reel shaft for winding a webbing therearound so as not to rotate relatively to the reel shaft; a second reel having a rotational shaft disposed parallel to and spaced away laterally from the first reel which winds a rope member including one end fixed to a predetermined position of the first reel; and urging force providing means accommodated inside the second reel. When the first reel is rotated by withdrawing the webbing, the rope member is wound around the first reel to cause a rotation of the second reel, by which the urging force providing means provides a force of urging the second reel in a direction of winding the webbing against this rotation of the second reel. In the seat belt retractor, by changing a rotational ratio of the first reel to the second reel, a force for withdrawing the webbing is decreased in accordance with an amount of withdrawal of the webbing.

The first reel is formed in a shape of a cylindrical drum, and the second reel is provided with a small diameter reel portion, a large diameter reel portion, and a transition portion connecting the small diameter reel portion and the large diameter reel portion. The rope member transferred from the first reel is wound around the large diameter reel portion through the small diameter reel portion and the transition portion.

In this case, preferably, the small diameter reel portion and the large diameter reel portion are coaxially provided in a step shape along an axial direction of the rotational shaft of the second reel, and formed integrally to constitute the second reel.

It is also preferable that an end surface of the large diameter reel portion is provided with a curved transition groove for connecting the small diameter reel portion and the large diameter reel portion, and the rope member is wound in the transition groove.

Further, in the above case, a spiral groove for communicating with the transition groove may be formed on a side surface of the large diameter reel portion, and the rope member is wound in the spiral groove.

Preferably, a line shape of the transition groove is a part of an arc having a diameter equivalent to an average of the diameter of the small diameter reel portion and the diameter of the large diameter reel portion.

DETAILED DESCRIPTION OF PREFERRED EMBODIMENTS

Figure 1:
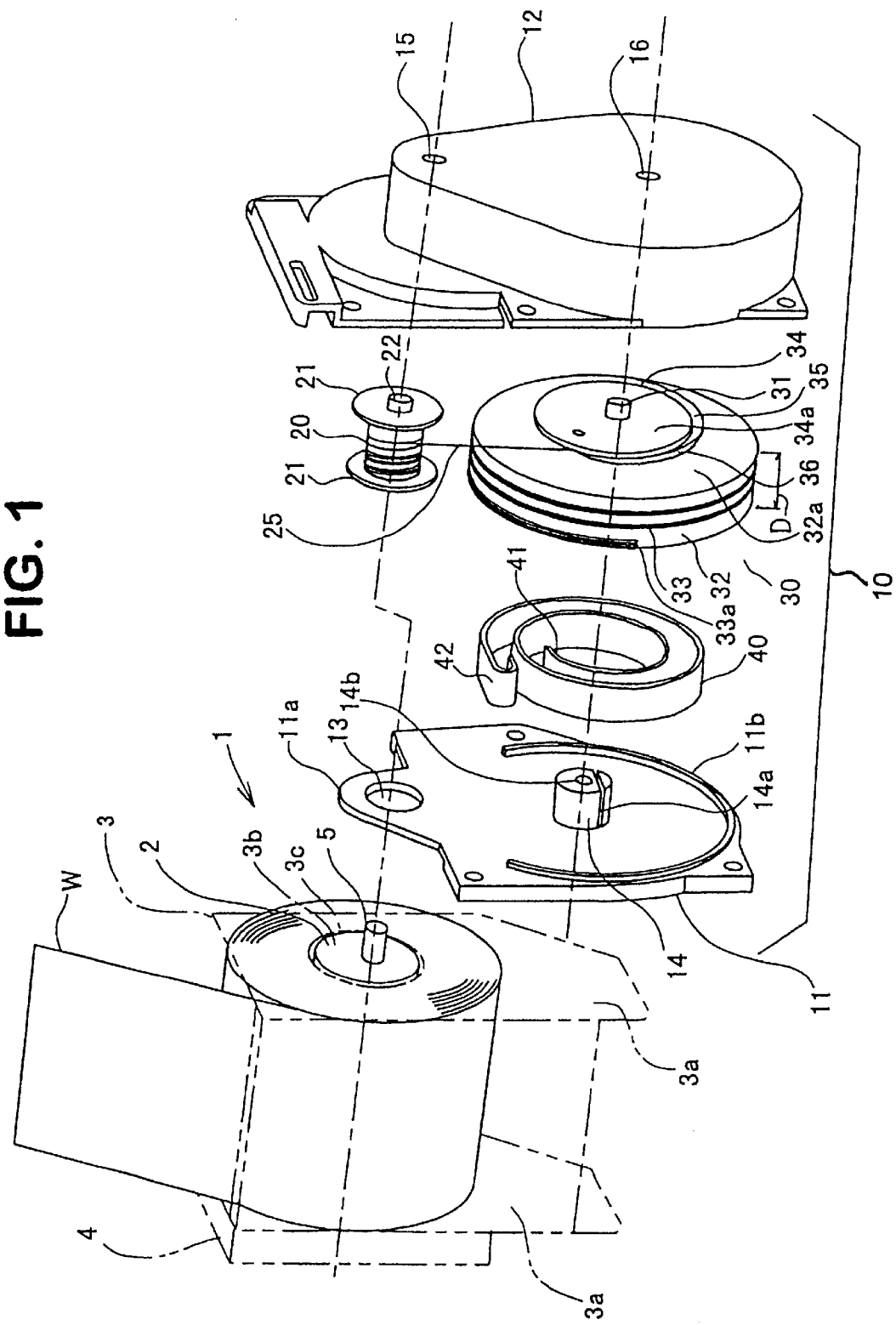
FIG. 1 is an exploded perspective view of a tension reducing mechanism of a seat belt retractor according to the present invention.

Hereinafter, a structure of a seat belt retractor of the present invention will be explained by referring to the attached drawings. FIG. 1 is an exploded perspective view showing an internal structure of a tension reducing mechanism as an assembly of the seat belt retractor of the invention.

The seat belt retractor 1 of the invention is generally formed of a reel shaft 2 on which a webbing W is wound up; a base frame 3, an outline of which is shown by imaginary lines, for freely rotatably supporting the reel shaft 2; a reel lock mechanism 4, an outline of which is shown by an imaginary line, for preventing a rotation of the reel shaft 2; and a tension reducing mechanism 10 which is a feature of the invention.

The base frame 3 is a steel plate product having a general U-shape in a plan shape, and supporting holes 3b through which end flanges of the reel shaft 2 fit with play are formed in right and left side walls 3a. Respective peripheral edges 3c of the supporting holes 3b are provided with sawtooth-like portions (not shown). An engaging piece (not shown) which swings by a locking operation of the known reel lock mechanism 4 and is attached to one of the side walls 3a, engages the peripheral edges 3c. This engagement motion locks a rotation of the reel shaft 2 to prevent withdrawal of the webbing in case the webbing is suddenly withdrawn from the seat belt retractor 1. The tension reducing mechanism 10 which can adjust a force of withdrawal of the webbing W is attached to the other of the side walls 3a of the base frame 3.

Figure 2:
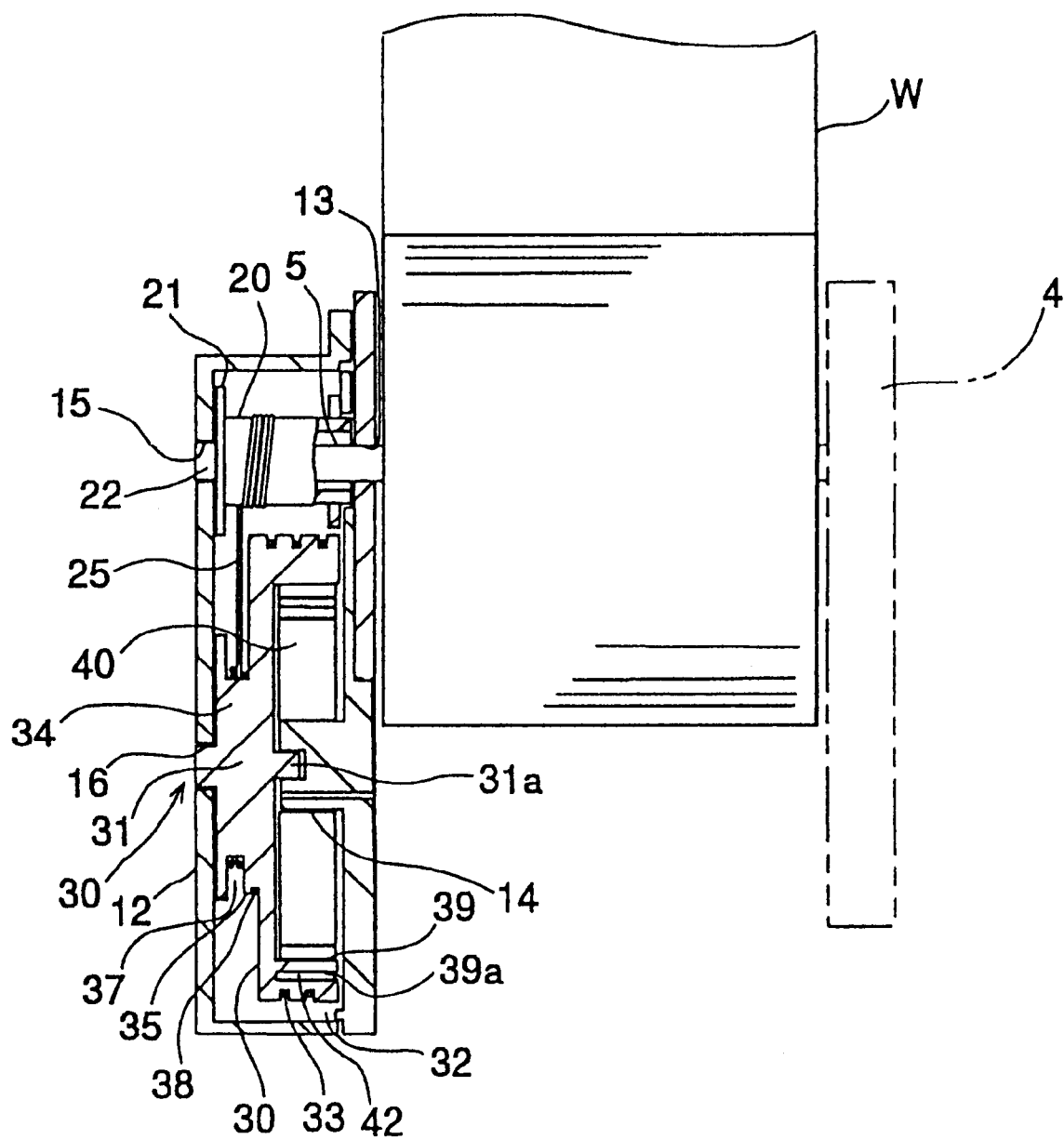
FIG. 2 is a partial sectional view integrally showing an internal structure of the tension reducing mechanism shown in FIG. 1 in a state that a webbing is wound most.

A structure of the tension reducing mechanism 10 is explained by referring to FIGS. 1 and 2. As shown in FIG. 1, the tension reducing mechanism 10 comprises a housing formed of a retainer plate 11 and a cover plate 12; a first reel 20 accommodated inside the housing as urging force transmitting means; a second reel 30 rotatable reciprocally with the first reel 20 through the rope 25 wound around the first reel 20 and extending between the reels, the second reel 30 having a larger diameter than that of the first reel 20; and a spiral spring 40 as urging force providing means disposed inside the second reel 30. The spiral spring 40 provides a predetermined torque to the second reel 30.

Among these members, the retainer plate 11 made of synthetic resin is fixed to the side wall 3a of the steel-made base frame 3 through a grommet and an engaging piece (not shown) which are integrally formed at a predetermined position. A bearing opening 13 is formed on an upper projection 11a of the retainer plate 11. A reel end of the first reel 20 is rotatably supported in the bearing opening 13. Also, a bearing boss 14 is integrally projected from an approximately central portion of the retainer plate 11. A rotational shaft end 31a of the second reel 30 is rotatably supported on the bearing boss 14. Further, an engaging groove 14a is formed in a part of the bearing boss 14. An inner peripheral end 41 of the spiral spring 40 is fixed in the engaging groove 14a. Furthermore, around the bearing boss 14, there is formed an arc-shaped guide 11b which is coaxial to an axis of the bearing boss 14 and has a size almost the same as an outer diameter of the second reel 30.

As shown in FIG. 2, the spiral spring 40 as the urging force providing means is accommodated in a hollow portion 39 formed at a side of the retainer plate 11 in the second reel 30. In the spiral spring 40, the inner peripheral end 41 is fixed to the bearing boss 14 of the retainer plate 11 as described above, and an outer peripheral end 42 is fixed to an engaging portion 39a formed in a part of an inner peripheral surface of the hollow portion 39. In this case, when the second reel 30 rotates around a rotational shaft 31 supported by the bearing boss 14 upon withdrawal of the webbing, an urging force for rotating the second reel 30 in the direction of winding up the webbing W is stored in the spiral spring 40.

Next, the two reels as the urging force transmitting means are explained. As shown in FIGS. 1 and 2, one end of the first reel 20 is fitted coaxially with an axial end of the rotational axis 5 of the reel shaft 2 not to rotate relative to each other, and is rotatably supported in the bearing opening 13 of the retainer plate 11. The other end of the first reel 20 fits in the bearing hole 15 formed in the cover plate 12. The first reel 20 has a length approximately the same as the inner size of the housing, and has a shape of a cylindrical drum with a uniform diameter. Both ends of the cylindrical drum are provided with flanges 21 to prevent a rope 25, described later, from being disengaged from the drum in case the rope 25 is wound several times. Also, the flanges 21 adequately define a space between the retainer plate 11 and the cover plate 12, so that the reel is prevented from being shifted in the axial direction in case the first reel 20 rotates.

Figure 4:
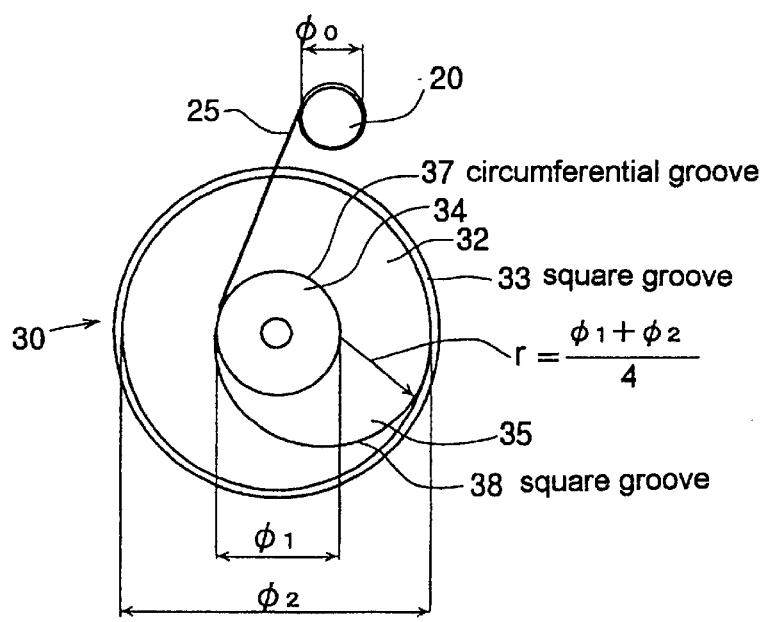
FIG. 4 is a schematic explanatory view showing positions of a first reel and a second reel, and a relationship of the sizes thereof, in a state that a rope is held between the reels.

On the other hand, the rotational shaft 31 of the second reel 30 is disposed parallel to the rotational shaft 22 of the first reel 20, and one end of the rotational shaft 31 is rotatably supported by a bearing hole 14b of the bearing boss 14 described above. The other end of the rotational shaft 31 is fitted in a bearing hole 16 formed in the cover plate 12. In the present embodiment, the proportion of a diameter Φ2 of the second reel 30 to a diameter Φ0 of the first reel 20 is set for 5:1 as shown in FIG. 4. Although the thickness D of the second reel 30 is determined by a plate width of the spiral spring 40 accommodated therein, the thickness D is set for about 10 mm here.

As shown in FIG. 1, a square groove 33 is spirally incised on a peripheral surface 32 having the largest diameter of the second reel 30, hereinafter referred to as a large diameter reel portion. The square groove 33 is incised in three turns on the peripheral surface of the large diameter reel portion 32 in the present embodiment. On the other hand, on an end surface 32a of the large diameter reel portion 32, a small diameter reel portion 34 having a diameter Φ1 is provided coaxially to the rotational shaft 31 of the second reel 30, and is formed integrally with the large diameter reel portion 32 in a step shape. The proportion of the diameter Φ1 of the small diameter reel portion 34 to the diameter Φ2 of the large diameter reel portion 32 is set for 2:5. Thus, the proportion of the diameter Φ0 of the first reel to the diameter Φ1 of the small diameter reel portion 34 is 1:2, and the proportion of the diameter Φ0 of the first reel to the diameter Φ2 of the large diameter reel portion 32 is 1:5, so that the rotation urging force by the spiral spring 40 is reduced in accordance with the proportions of the diameters, and transmitted to the first reel 20.

A disc-shaped flange 34a is integrally formed on an end surface of the small diameter reel portion 34, and the small diameter reel portion 34 constitutes a circumferential groove 37. Further, to communicate between the circumferential groove 37 of the small diameter reel portion 34 and the square groove 33 of the large diameter reel portion 32, a square groove 38 constituting a diameter transition portion 35 in a semicircular shape having a diameter of R=(Φ1+Φ2)/2 (radius r=(Φ1+Φ2)/4) is formed from a position, in which the square groove 33 contacts the end surface 32a, to the end surface 32a as shown in FIG. 4. Incidentally, a line shape of a groove curve of the square groove 38 as the diameter transition portion 35 is not limited to a part of the arc, and can be one of various kinds of smooth curves, such as involute and hyperbola.

As described above, the rope 25 with a small diameter is wound around the first reel 20 and the successive square grooves 37, 38 and 33 of the second reel 30 as shown in FIG. 2.

Although a rope formed of aramide fibers with a diameter of about 0.5 mm is used as the rope 25 in the present embodiment, various kinds of fiber ropes can be used as long as an elongation amount of the rope is below an allowable value in case of applying a predetermined tension to the rope. In a condition that the webbing W is wound up substantially in the retractor 1, one end of the rope 25 is fixed to the drum of the first reel 20, and the rope 25 is wound therearound several times. Then, the rope 25 is extended to the small diameter reel portion 34 of the second reel 30 with a predetermined tension. In the small diameter reel portion 34 of the second reel 30, the rope, which enables about half of the entire withdrawing amount of the webbing to be withdrawn, is wound in the circumferential groove 37 in advance. Further, the rope 25 is guided to the large diameter reel portion 32 along the square groove 38 of the diameter transition portion 35, and the rest of the rope 25 is wound around the entire periphery or length of the square groove 33 of the large diameter reel portion 32. The final end of the rope 25 is fixed to a fixing portion 33a at the end of the square groove through fixing means, such as a screw or the like (not shown).

Incidentally, FIG. 2 shows a state that the webbing W is wound up most in the seat belt retractor 1. In this state, the rope 25 extends between the first reel 20 and the small diameter reel portion 34 of the second reel 30.

Figure 3:
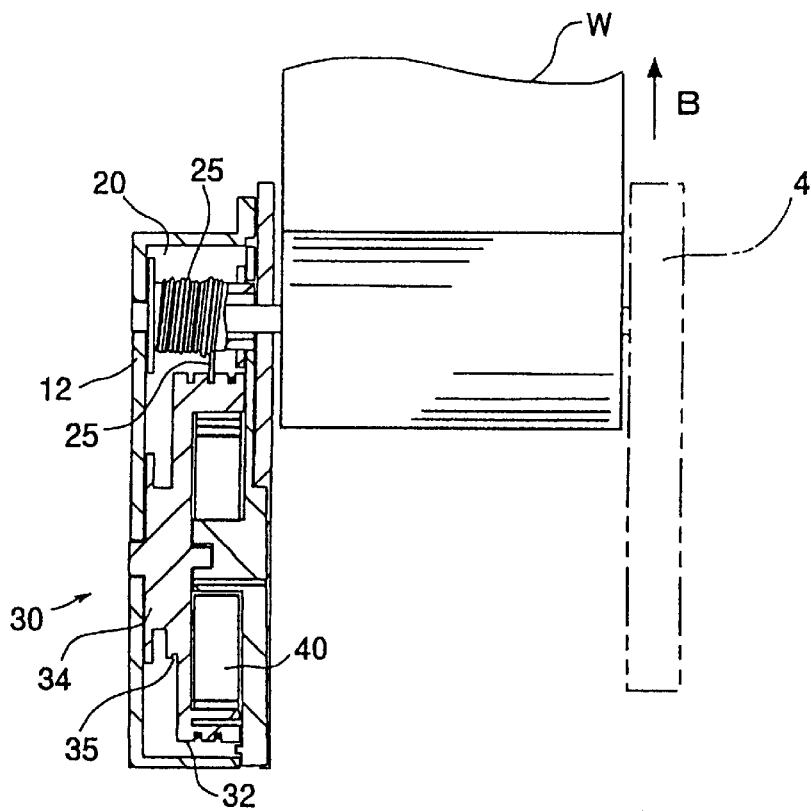
FIG. 3 is a partial sectional view integrally showing an internal structure of the tension reducing mechanism in a state that the webbing is withdrawn most.

FIG. 3 shows a state that the webbing W in the webbing wound up state is withdrawn to the maximum withdrawal length. By withdrawing the webbing W in a direction of an arrow B in the figure, the first reel 20 integrally connected to the axial end of the rotational axis 5 of the reel shaft 2 rotates along with the rotation of the reel shaft 2, and an operation of winding the rope 25 wound around the second reel 30 onto the first reel 20 is started. Then, when the webbing withdrawal length reaches the maximum, the rope 25 extends between the first reel and the large diameter reel portion 32 of the second reel.

Figure 5A:
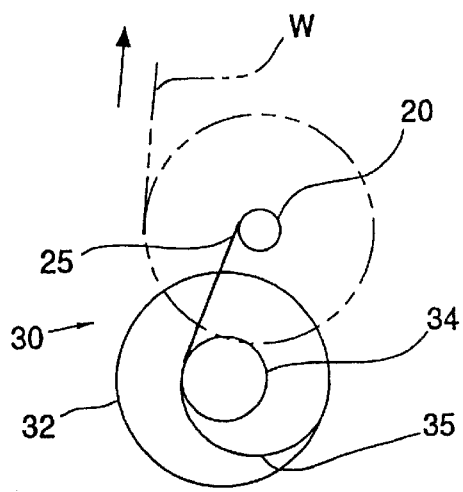
FIGS. 5(a), 5(b) and 5(c) are schematic explanatory views showing a relationship between a state of withdrawing the webbing and a state of winding the rope wound up on the second reel.

Here, a state of winding the rope 25 in the second reel 30 in accordance with the amount of withdrawal of the webbing W and a reducing effect of a force for withdrawing the webbing according to the state of winding of the rope are explained with reference to FIG. 5(a) through FIG. 6.

Figure 5B:
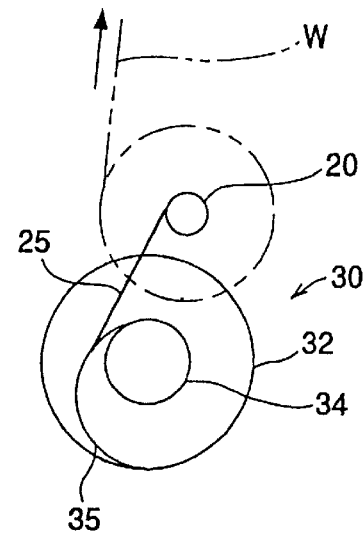
Figure 5C:
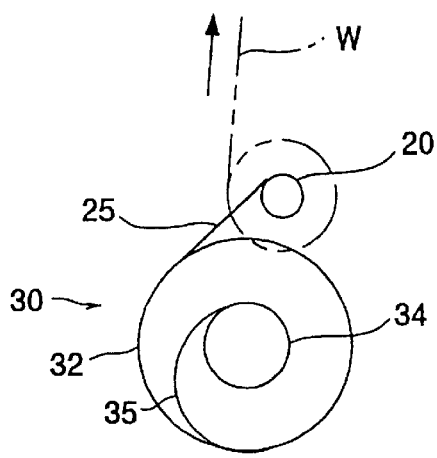

In the present embodiment, the entire length of withdrawal of the webbing W is set for 2,000 mm. By an operation of withdrawal of the webbing W in the length of about 1,000 mm equivalent to a first half of the entire withdrawal length, the rope 25 wound around the circumferential groove 37 in the small diameter reel portion 34 of the second reel 30 is withdrawn therefrom to be wound around the first reel 20 as shown in FIG. 5(a). Meanwhile, a force for urging rotation corresponding to the rotation of the second reel is stored in the spiral spring 40 disposed inside the second reel 30. Therefore, according to the amount of withdrawal of the webbing W, the force for withdrawing the same is gradually increased as shown as (1) in FIG. 6. When the webbing W is withdrawn further, the rope 25 wound around the square groove 38 of the diameter transition portion 35 in the second reel 30 is unwound therefrom, and then the rope 25 wound around the large diameter reel portion 32 is unwound therefrom as shown in FIGS. 5(b) and 5(c).

Figure 6:
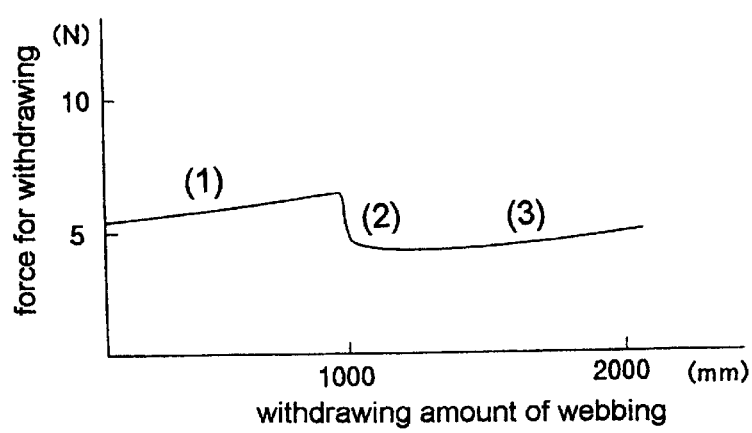
FIG. 6 is a diagram of a relationship curve showing a relationship between an amount of withdrawal of the webbing and the force of withdrawal of the webbing in the seat belt retractor.
Figure 7:
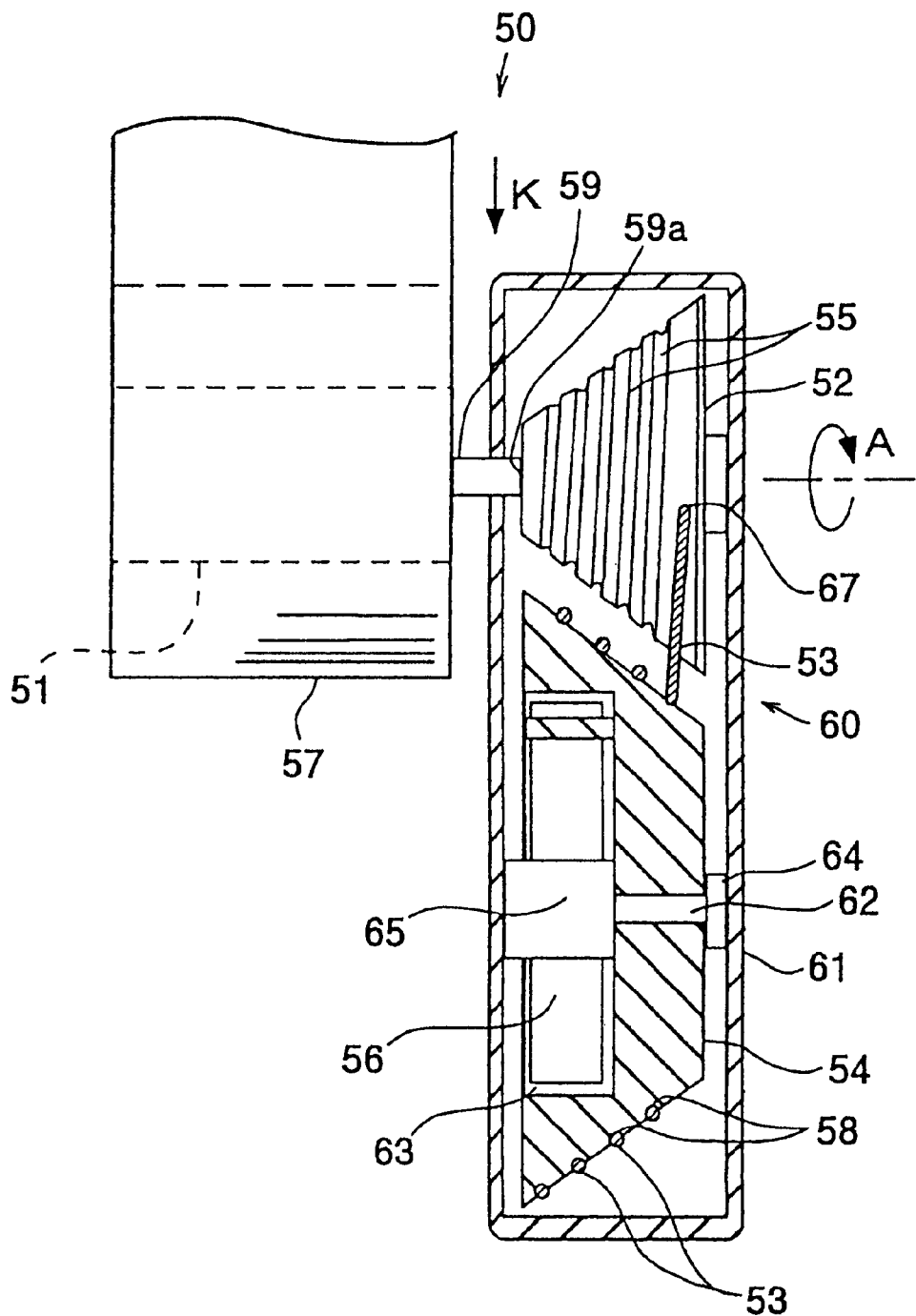
FIG. 7 is a partial sectional view showing an internal structure of a tension reducing mechanism of a conventional seat belt retractor.

At this time, the force for withdrawing the webbing W is suddenly decreased when unwinding the rope 25 is finished at the diameter transition portion 35 and is transferred to the large diameter reel portion 32 as shown as length (2) in FIG. 6, because of a wheel and axle effect obtained by a sudden increase in the diameter of the wound rope. Then, the force for withdrawing the webbing W at the large diameter reel portion 32 has a low value, and is gradually increased to the maximum length of withdrawal as shown as length (3) in FIG. 6.

As described above, in the seat belt retractor of the embodiment, the first reel has a shape of a cylindrical drum with the small diameter, and on the other hand, the second reel is provided with the small diameter portion and the large diameter portion. The small diameter portion and the large diameter portion are connected by the spiral transition portion, and the rope extends between the first reel and the second reel. Therefore, assembly of the respective members is improved. Also, in the operation, regardless of the amount of withdrawal of the webbing, the webbing can be withdrawn by almost a uniform force for withdrawal, and loosening of the rope does not occur even after sudden withdrawal of the webbing. Therefore, high reliability is obtained in the winding and withdrawing operations of the webbing.

While the invention has been explained with reference to the specific embodiments of the invention, the explanation is illustrative and the invention is limited only by the appended claims.

What is claimed is:

1. A seat belt retractor, comprising:

a reel shaft for winding a webbing therearound having a rotational axis, a first reel coaxially connected to the rotational axis of the reel shaft without slippage and having a shape of a cylindrical drum, a second reel including a rotational shaft disposed parallel to the first reel and laterally spaced apart therefrom, a large diameter reel portion with an end surface, a small diameter reel portion having a diameter smaller than that of the large diameter reel portion and situated adjacent to the large diameter reel portion, and a transition portion formed at the end surface and having a curved transition groove for connecting the small diameter reel portion and the large diameter reel portion, said transition groove having a shape of a part of an arc with a radius equivalent to an average of a radius of the small diameter reel portion and a radius of the large diameter reel portion, a rope member having one end fixed to the first reel and wound around the first reel, said rope member extending from the first reel to the large diameter reel portion through the small diameter reel portion and the transition portion and wound therearound including the transition groove so that a rotational ratio of the first reel to the second reel is changed, and urging means disposed inside the second reel for urging the second reel to rotate in a direction of winding of the webbing against a rotation of the second reel resulting from a rotation of the first reel caused by winding of the rope member around the first reel when the webbing is withdrawn from the reel shaft, a force for withdrawing the webbing being decreased in accordance with an amount of withdrawal of the webbing by changing the rotational ratio of the first reel to the second reel.

2. A seat belt retractor as claimed in claim 1, wherein the small diameter reel portion and the large diameter reel portion are coaxially provided in a step shape along an axial direction of the rotational shaft of the second reel and are formed integrally to constitute the second reel.

3. A seat belt retractor as claimed in claim 1, wherein said large diameter reel portion includes an outer peripheral surface having a spiral groove for communicating with the transition groove.

4. A seat belt retractor as claimed in claim 3, wherein said first reel has a diameter smaller than that of the small diameter reel portion.

5. A seat belt retractor as claimed in claim 4, wherein said rope member has a length wound on the first and second reels for allowing the webbing wound on the reel shaft to be substantially completely withdrawn from the reel shaft, said rope member being wound on the small diameter reel portion for allowing nearly half of the webbing to be withdrawn from the reel shaft.

6. A seat belt retractor as claimed in claim 5, wherein when the webbing is fully retracted on the reel shaft, said rope member is disposed in the spiral groove and the transition groove without overlapping, and is wound around the small diameter reel portion more than once.

* * * * *